United States Patent [19]

Meier et al.

[11] Patent Number: 5,230,420

[45] Date of Patent: Jul. 27, 1993

[54] LINE GUIDING ASSEMBLY WITH ROLLING DEVICE

[76] Inventors: Karl Meier, Westendstr. 12, 8548 Heideck; Josef Steff, Hagenbuchring 19, 8831 Meinheim, both of Fed. Rep. of Germany

[21] Appl. No.: 994,187

[22] Filed: Dec. 21, 1992

Related U.S. Application Data

[63] Continuation of Ser. No. 805,276, Dec. 10, 1991, abandoned.

[30] Foreign Application Priority Data

Nov. 4, 1991 [EP] European Pat. Off. ............ 91118861

[51] Int. Cl.⁵ .............................................. B65G 25/00
[52] U.S. Cl. ..................................................... 198/750
[58] Field of Search .......................................... 198/750

[56] References Cited

U.S. PATENT DOCUMENTS

| | | | |
|---|---|---|---|
| 3,888,366 | 6/1975 | Prahst | 198/750 X |
| 4,371,305 | 2/1983 | Pannell | 198/750 X |
| 4,624,359 | 11/1986 | Gross | 198/750 X |
| 5,046,690 | 9/1991 | Nordstrom | 198/750 X |
| 5,054,605 | 10/1991 | Bavis | 198/750 |

Primary Examiner—D. Glenn Dayoan
Attorney, Agent, or Firm—Dena Meyer Weker

[57] ABSTRACT

A line guiding assembly is provided comprising a line assembly including one or more lines and having a first length and a second length extending parallel thereto. The length ends are connected to a stationary element and to a reciprocable element in the line longitudinal direction, respectively. The two lengths merge with each other in loop-shaped manner in a bending portion located therebetween. The line assembly, at least in the portion in which the two lengths are facing each other, is provided with a material having good slidability for sliding on each other. A roller is introduced in the bending portion in such a manner that, upon movement of the reciprocable element, the line assembly performs a rolling motion on the roller.

9 Claims, 3 Drawing Sheets

LINE GUIDING ASSEMBLY WITH ROLLING DEVICE

This application is a continuation of application Ser. No. 07/805,276 filed Dec. 10, 1991 now abandoned.

FIELD OF THE INVENTION

The invention relates to a line guiding assembly comprising a line assembly including one or more lines and having a first length and a second length extending parallel thereto, the length ends begin connected to a stationary means and to a means reciprocable in the line longitudinal direction, respectively, and said two lengths merging with each other in loop-shaped manner in a bending portion located therebetween, and the line assembly, at least in the portion in which the two lengths are facing each other, is provided with a material having good slidability for sliding on each other.

BACKGROUND OF THE INVENTION

Co-pending U.S. Pat. application U.S. Ser. No. 07/807,018 also filed in the European Patent Office as EP91105430.2 and hereinafter referred to in this specification as EP91105430.02, describes a line guiding assembly comprising a line guiding channel and a line assembly guided therein and connecting a stationary means and a reciprocable means to each other which are connected to the ends of an upper length and a lower length, respectively. The two lengths merge with each other in a loop-shaped manner in a bending portion located therebetween. When the upper length is longer, the upper length is deposited on the lower length. At least on that side of the line assembly where upper length and lower length are facing each other, the line assembly is provided with a material of good slidability on each other.

Such a line guiding assembly can also be used for replacing conventional dragchains which are complex, may result in a considerable mechanical load of the lines guided therein and may cause disturbing noises in moving operation.

In the line assembly described in EP91105430.2, oscillations, especially in the upper length portion, may arise during the rapid movements that may be performed by the reciprocable means, which for instance may be a robot.

Both the line or cable jackets and the sliding means of the line assembly consist preferably of plastic material. In case of a longer standstill of the movable means, such that the bending portion between upper length and lower length is located at the same position of the line assembly for a prolonged period of time, a permanent deformation of the line assembly may be caused at this location, for instance by formation of a bulge. When the movable means then resumes its motion, upsetting or even distortions of the line assembly in the bulge portion may occur at the high movement speeds which such movable means can reach. This may result in damage to the line assembly.

SUMMARY OF THE INVENTION

A line guiding assembly comprising a line assembly with one or more lines, having a first length and a second length extending parallel thereto, the length ends connected to a stationary means and to a reciprocable or movable means in the line longitudinal direction, wherein the two lengths merge with each other in a loop-shaped manner in a bending portion, this guiding assembly is further provided with a roller that is introduced in the bending portion between the two lengths in such a manner that, upon movement of the movable means, the line assembly performs a rolling motion on the roller.

Preferably the roller is loosely inserted in the bending portion. For ensuring good lateral guidance of the line assembly, the line assembly is preferably guided together with the roller in a line guiding channel.

In a particularly preferred embodiment the roller diameter is larger than the bending diameter of the bending portion of the line assembly without the roller, with this bending diameter resulting from the own weight of the line assembly and from the bending resistance of the line assembly. The roller diameter advantageously is larger than the maximum bending diameter of the line assembly without the roller by such an extent that the portion of the line assembly located above the roller is supported on its entire own weight on the roller. The roller diameter can be made larger than the bending diameter to such an extent that the wrap angle enclosing the roller in the bending portion is more than 180° and possibly is as high as about 240°.

Between the outer circumference of the roller and the portion of the line assembly performing a rolling motion on the roller, there should be such force engagement (for instance by friction) or such positive engagement (for instance by toothed engagement) that slippage between the roller and the line assembly is avoided also at maximum movement speed of the movable means moving towards the roller.

The roller preferably is designed to be approximately as wide as the line assembly. Furthermore, the outside profile of the roller can be matched to the profile of the line assembly portion performing a rolling motion on said roller.

The mass of the roller should be as low as possible.

Preferred materials for the roller include polypropylene, polyamide, POM, PVC. Preferred materials for the sliding means of the line assembly include polypropylene. Finally, preferred materials for the cable jacket of the lines include PVC, polyurethane, polyester.

The roller can be made of a solid, light plastic material and may have applied on its outer circumference a jacket of a material with a high friction factor, such as rubber, for increasing the friction between the line assembly and the roller.

The line assembly in the bending portion is kept at a constant bending radius, even in the case of rapid acceleration or deceleration of the movable means and thus of the length of the line assembly connected thereto. Furthermore, the bending radius in the bending portion of the line assembly can be adjusted by selection of the roller diameter. A greater bending radius leads to a longer lifetime of the line assembly. Even when the movable means is at a standstill for a longer period of time, there is no formation of breaks or bulges in the bending portion caused by the own weight of the line assembly, since the line in the bending portion is supported on the roller.

Furthermore, it has turned out that the roller according to the invention acts as a dampening member, such that there are considerably fewer oscillations caused in the system as a whole than without the roller.

DETAILED DESCRIPTION OF THE INVENTION

The invention is best understood by reference to the accompanying drawings.

Figure 1:
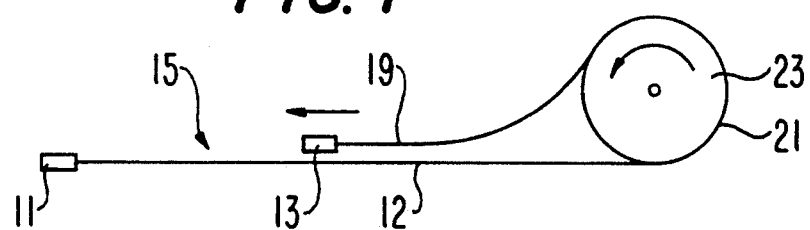
FIG. 1 is a schematic side view of a line assembly according to the invention, comprising a roller and being depicted in a first movement phase.

FIG. 1 shows in schematic outline a stationary means 11 and a reciprocable means 13 which are connected to each other via a line assembly 15.

Figure 2:
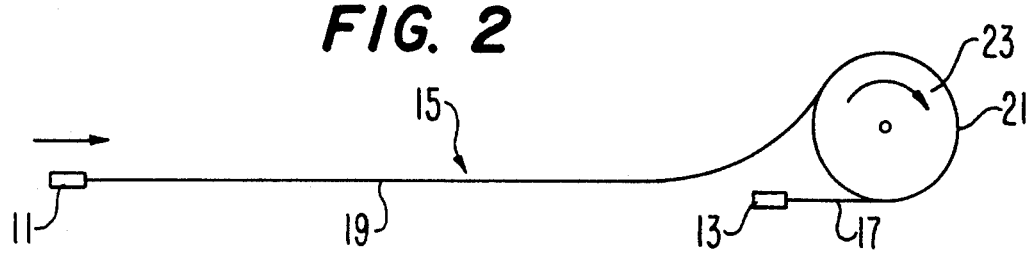
FIG. 2 shows the line assembly of FIG. 1 in a second movement phase.

In the embodiment depicted in FIGS. 1 and 2, the movable means 13 moves in horizontal direction. However, the present invention could also encompass an embodiment in which the movable means 13 moves in vertical direction or in an inclined direction with respect thereto.

Figure 6:
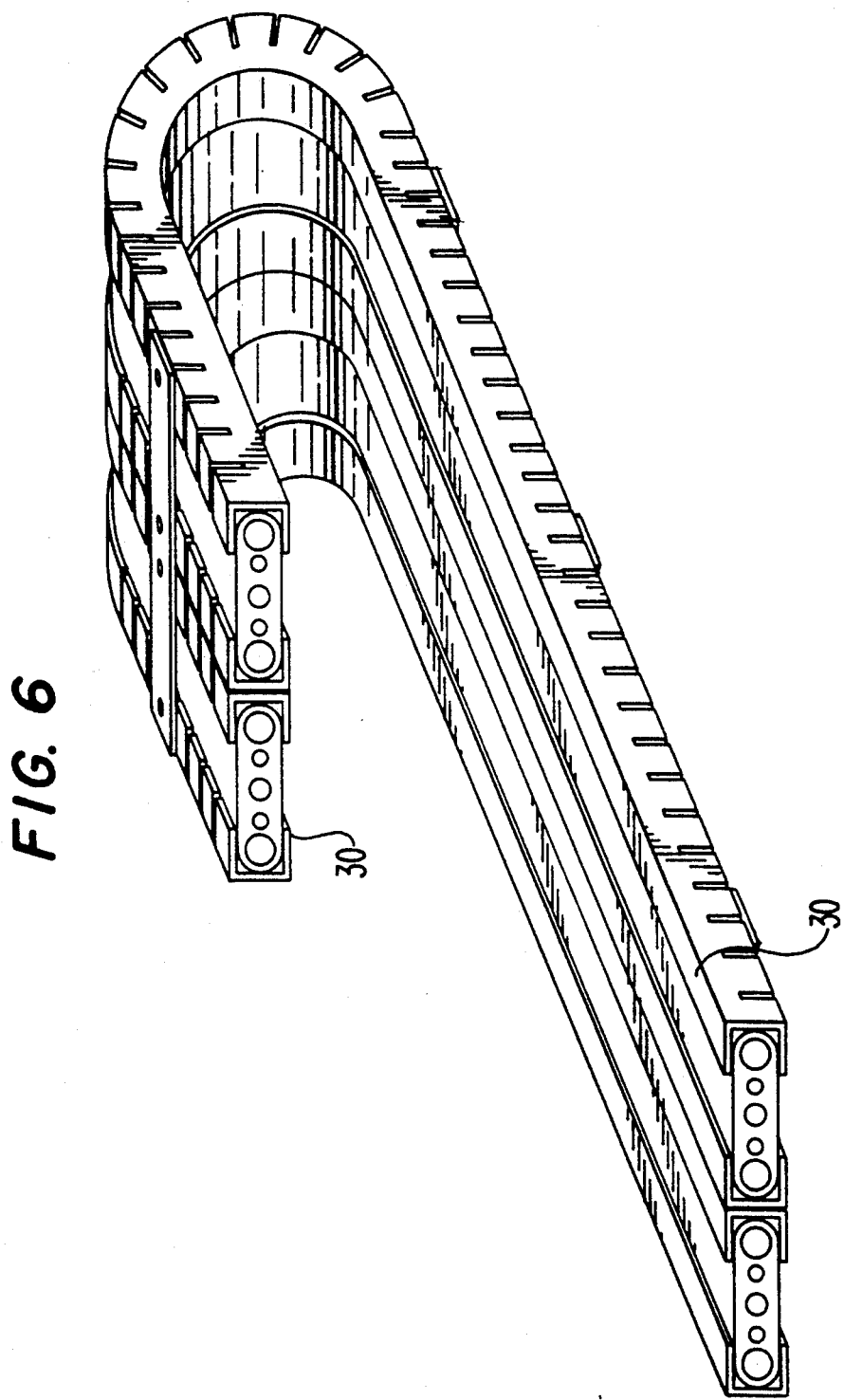
FIG. 6 shows a schematic view of a line guiding channel.
Figure 7:
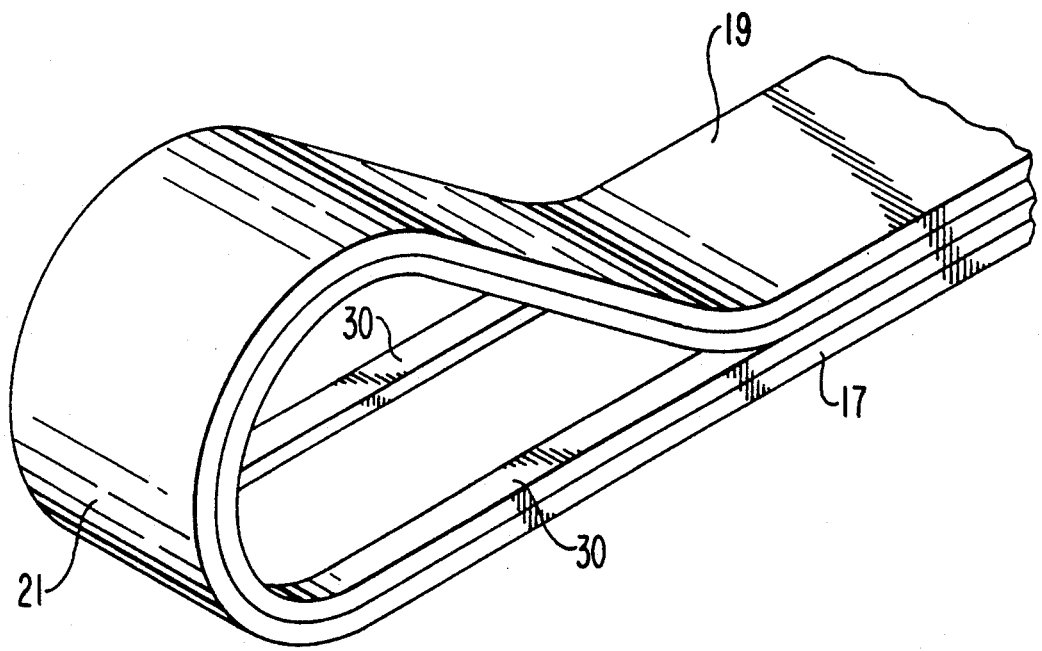
FIG. 7 shows a ribbon cable having a sliding means in the form of sliding bands.

In the embodiment shown the line assembly 15 comprises a lower length 17 and an upper length 19 which are interconnected via a bending portion 21. In the bending portion 21, the line assembly 15 performs a rolling motion on a loosely inserted roller 23. When the upper length 19 has a correspondingly high longitudinal dimension, the portion adjacent the movable means 13 is deposited on the lower length 17. On the side on which lower length 17 and upper length 19 are facing each other, the line assembly 15 is provided with a sliding means. It is avoided thereby that the lines or cables, whose line or cable jackets usually consist of a material having a high friction factor, are rubbed directly on each other. Sliding means suitable for such a line assembly constituting a dragchain substitute are described in EP91105430.2 as shown in FIGS. 6 and 7 in which the sliding means are identified as element 30.

While FIG. 1 depicts a movement phase in which the movable means 13 moves away from roller 23, FIG. 2 shows a movement phase in which the movable means 13 moves towards roller 23.

Figure 3:
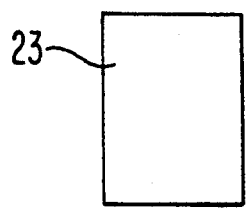
FIGS. 3 to 5 show rollers with different surface configurations.
Figure 4:
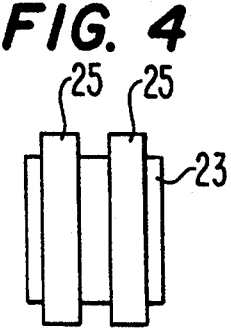
Figure 5:
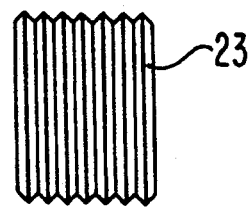

FIGS. 3 to 5 illustrate various roller designs. The roller shown in FIG. 3 has a smooth outer circumference. This circumference is made for instance of rubber in order to effect high friction with respect to the material of the sliding means of the line assembly 15. The width of roller 23 is preferably equal to the width of line assembly 15. However, the roller 23 may also be narrower or wider than line assembly 15.

The roller configuration shown in FIG. 4 is adapted with respect to its circumferential profile to the profile on that side of the line assembly 15 which performs a rolling motion on roller 23. The roller profile shown in FIG. 4 is intended to be used for a line assembly as shown in FIG. 6 similar to FIG. 28 of EP91105430.2. In that figure, two juxtaposed ribbon cables are provided at their two longitudinal side edges with a sliding channel each, and the four sliding channels are fastened to each other by means of transverse lugs. To this end, the roller 23 shown in FIG. 4 has circumferential ribs 25 which come to lie between the sliding channels and are in direct contact with the cable jacket of one of the two ribbon cables each. A relatively high friction between the roller 23 and the cable of the line guiding assembly is achieved in addiction to achieving axial guiding of the roller 23 with respect to the line assembly.

The roller shown in FIG. 5 has a grooved outer circumference which again improves both the friction and the axial guiding effect between line assembly 15 and roller 23.

A line guiding channel as shown in FIG. 6 may also be provided with allows for lateral guidance both of the line assembly 15 and of the roller 23 inserted therein.

The term "roller" is to be understood in a very general way herein. It is to comprise roller-like configurations, either solid or hollow, spherical configurations and polygonal configurations.

We claim:

1. A line guiding assembly comprising:
   (a) a line assembly comprising at least one line having a first and a second length extending parallel thereto;
   (b) a stationary means and a reciprocable means traversing in a longitudinal direction parallel to the line assembly wherein the stationary means is connected to a first length end and the reciprocable means is connected to a second length end, and wherein the two lengths merge with each other to form a loop so that the two lengths face each other in a portion and are provided with a material enabling them to slide on each other; and
   (c) a roller positioned in the loop in such a manner that, upon movement of the reciprocable means, the line assembly performs a rolling motion on the roller.

2. A line guiding assembly according to claim 1, wherein the roller is loosely inserted within the loop.

3. A line guiding assembly according to claim 1, wherein the line assembly together with the roller is guided in a line guiding channel.

4. A line guiding assembly according to claim 1, wherein frictional engagement is present between the surface of the roller and the surface of the line assembly performing a rolling motion thereon.

5. A line guiding assembly according to claim 1, wherein the profile of the outer circumference of the roller is adapted in complementary manner to the profile of the surface portion of the line assembly performing a rolling motion on the roller.

6. A line guiding assembly according to claim 1, wherein the roller diameter is larger than the maximum bending diameter that would be assumed by the line assembly in moving operation without the roller.

7. A line guiding assembly according to claim 6, wherein the roller diameter is larger than the maximum bending diameter of the line assembly without the roller by such an extent that the portion of the line assembly located above the roller is supported on the roller with its entire own weight.

8. A line guiding assembly according to claim 7, wherein the roller diameter is larger than the maximum bending diameter of the line assembly without the roller by such an amount that the line assembly is wrapped around the roller by more than 180°.

9. A line guiding assembly according to claim 6, wherein the roller diameter is at least 50 mm larger than the bending diameter of the line assembly without the roller.

* * * * *

UNITED STATES PATENT AND TRADEMARK OFFICE
CERTIFICATE OF CORRECTION

PATENT NO. : 5,230,420
DATED : July 27, 1993
INVENTOR(S) : Karl Meier, et. al.

It is certified that error appears in the above-indentified patent and that said Letters Patent is hereby corrected as shown below:

On the Title page, item [30], under Foreign Application Priority Data, change "91118861" to --91118661--.

Signed and Sealed this

Fifth Day of April, 1994

*Attest:*

BRUCE LEHMAN

*Attesting Officer*     *Commissioner of Patents and Trademarks*